US009312733B2

(12) United States Patent
Ramu

(10) Patent No.: US 9,312,733 B2
(45) Date of Patent: Apr. 12, 2016

(54) HIGH POWER DENSITY SRM

(75) Inventor: Krishnan Ramu, Blacksburg, VA (US)

(73) Assignee: REGAL BELOIT AMERICA, INC., Beloit, WI (US)

( * ) Notice: Subject to any disclaimer, the term of this patent is extended or adjusted under 35 U.S.C. 154(b) by 497 days.

(21) Appl. No.: 13/285,196

(22) Filed: Oct. 31, 2011

(65) Prior Publication Data

US 2012/0104895 A1     May 3, 2012

Related U.S. Application Data

(60) Provisional application No. 61/409,638, filed on Nov. 3, 2010.

(51) Int. Cl.
| | |
|---|---|
| H02K 1/14 | (2006.01) |
| H02K 1/32 | (2006.01) |
| H02K 1/20 | (2006.01) |
| H02K 1/24 | (2006.01) |
| G01B 11/26 | (2006.01) |
| H02K 15/12 | (2006.01) |

(52) U.S. Cl.
CPC ........ H02K 1/32 (2013.01); G01B 11/26 (2013.01); H02K 1/14 (2013.01); H02K 1/20 (2013.01); H02K 1/24 (2013.01); *H02K 1/146* (2013.01); *H02K 1/148* (2013.01); *H02K 15/12* (2013.01); *Y02T 10/641* (2013.01)

(58) Field of Classification Search
CPC ....... H02K 23/40; H02K 23/24; H02K 23/42; H02K 1/141; H02K 21/16; H02K 1/16
USPC ................... 310/216.076, 216.004, 216.091, 310/216.106, 216.107, 186
See application file for complete search history.

(56) References Cited

U.S. PATENT DOCUMENTS

| | | | | |
|---|---|---|---|---|
| 4,217,511 A | * | 8/1980 | King et al. ...................... 310/55 |
| 4,475,051 A | * | 10/1984 | Chai et al. .................. 310/49.44 |
| 4,496,887 A | * | 1/1985 | Ichihara et al. .......... 318/400.41 |
| 4,725,751 A | | 2/1988 | Bassler et al. |
| 4,743,825 A | | 5/1988 | Nashiki |
| 4,990,809 A | * | 2/1991 | Artus et al. .................... 310/192 |
| 5,005,281 A | * | 4/1991 | Burns ............................. 29/596 |

(Continued)

FOREIGN PATENT DOCUMENTS

| | | | | |
|---|---|---|---|---|
| CH | 0153588 A | * | 3/1932 | ............. H02K 23/42 |
| CN | 103190069 A | | 7/2013 | |

(Continued)

OTHER PUBLICATIONS

International Preliminary Report on Patentability issued in International PCT Application No. PCT/US2011/058539 mailed on Mar. 6, 2014.

(Continued)

*Primary Examiner* — Burton Mullins
(74) *Attorney, Agent, or Firm* — Armstrong Teasdale LLP

(57) ABSTRACT

An electromagnetic machine stator has a common pole and a plurality of excitation poles. Each excitation pole has a coil wound around it for inducing a magnetic flux through the excitation pole. The common pole that does not have a coil wound around it for inducing a magnetic flux. A flux barrier, disposed within the common pole, inhibits the flow of flux from one part of the common pole across the flux barrier to another part of the common pole. The flux barrier is less conducive to the flow of flux than is the common pole.

10 Claims, 9 Drawing Sheets

(56) References Cited

U.S. PATENT DOCUMENTS

| | | | |
|---|---|---|---|
| 5,015,903 | A | 5/1991 | Hancock et al. |
| 5,053,666 | A | 10/1991 | Kliman et al. |
| 5,250,867 | A * | 10/1993 | Gizaw ........................ 310/179 |
| 5,604,388 | A | 2/1997 | Baker et al. |
| 5,739,615 | A | 4/1998 | McClelland |
| 5,838,087 | A | 11/1998 | Tang |
| 5,864,477 | A | 1/1999 | Webster |
| 5,909,071 | A | 6/1999 | Sakuma et al. |
| 6,037,740 | A | 3/2000 | Pollock et al. |
| 6,043,574 | A * | 3/2000 | Prudham ..................... 310/49.08 |
| 6,091,168 | A | 7/2000 | Halsey et al. |
| 6,483,210 | B1 | 11/2002 | Soderberg |
| 6,720,686 | B1 * | 4/2004 | Horst ............................. 310/51 |
| 6,849,985 | B2 * | 2/2005 | Jack et al. .............. 310/216.008 |
| 6,988,689 | B2 | 1/2006 | Thomas et al. |
| 7,271,564 | B2 | 9/2007 | Ramu |
| 7,468,570 | B2 * | 12/2008 | Ionel et al. ............. 310/216.009 |
| 7,528,516 | B2 * | 5/2009 | Mipo et al. .................... 310/187 |
| 7,732,967 | B2 * | 6/2010 | Vollmer et al. ............... 310/184 |
| 8,004,141 | B2 * | 8/2011 | Jeung ........................... 310/186 |
| 8,089,192 | B2 * | 1/2012 | Li et al. .................. 310/216.009 |
| 8,102,093 | B2 * | 1/2012 | Prudham ................ 310/216.071 |
| 8,754,605 | B2 | 6/2014 | Ramu |
| 2004/0008003 | A1 | 1/2004 | Turner |
| 2004/0021395 | A1 | 2/2004 | Maslov et al. |
| 2004/0085040 | A1 | 5/2004 | Chen |
| 2005/0156475 | A1 | 7/2005 | Ramu et al. |
| 2006/0232069 | A1 | 10/2006 | Lim et al. |
| 2006/0273680 | A1 | 12/2006 | Ramu et al. |
| 2007/0008744 | A1 | 1/2007 | Heo et al. |
| 2007/0182383 | A1 | 8/2007 | Park et al. |
| 2007/0273322 | A1 | 11/2007 | Ramu |
| 2008/0030092 | A1 | 2/2008 | Rolando Avila Cusicanqui |
| 2008/0246362 | A1 | 10/2008 | Hirzel |
| 2009/0045768 | A1 | 2/2009 | Ramu |
| 2010/0060223 | A1 | 3/2010 | Sakai et al. |
| 2010/0141061 | A1 * | 6/2010 | Ramu et al. ..................... 310/46 |
| 2010/0181858 | A1 | 7/2010 | Hibbs et al. |

FOREIGN PATENT DOCUMENTS

| | | | | |
|---|---|---|---|---|
| DE | 10229333 | * | 1/2004 | ............... H02K 1/06 |
| EP | 2636141 A1 | | 9/2013 | |
| FR | 317609 | * | 9/1902 | ............ H02K 23/42 |
| FR | 856500 | * | 6/1940 | ............ H02K 23/42 |
| GB | 1300549 | * | 12/1972 | ............ H02K 23/40 |
| JP | 47-42256 | * | 12/1972 | |
| JP | 51-125804 | * | 11/1976 | ............... H02K 1/16 |
| JP | 55-94548 | | 7/1980 | |
| JP | 58-165640 | | 9/1983 | |
| JP | 64-69239 | | 3/1989 | |
| WO | 2009023205 A1 | | 2/2009 | |
| WO | 2012061271 A2 | | 5/2012 | |
| WO | 2012061273 A2 | | 5/2012 | |
| WO | 2012061456 A1 | | 5/2012 | |
| WO | 2012061458 A1 | | 5/2012 | |

OTHER PUBLICATIONS

International Search Report and Written Opinion issued in International PCT Application No. PCT/US2011/058539 mailed on Feb. 1, 2013.

International Search Report and Written Opinion issued in International PCT Application No. PCT/US2011/058887 mailed on Mar. 7, 2012.

International Search Report and Written Opinion issued in International PCT Application No. PCT/US2011/058890 mailed on Mar. 7, 2012.

International Preliminary Report on Patentability, issued in International PCT Application No. PCT/US2011/058536 mailed on May 27, 2014.

International Search Report and Written Opinion issued in International PCT Application No. PCT/US2011/058536 mailed on May 15, 2014.

Chinese Patent Application No. 201180053210.1 filed May 3, 2013.
European Patent Application No. 2011838721.6 filed May 3, 2013.

* cited by examiner

HIGH POWER DENSITY SRM

This application claims priority to U.S. provisional application 61/409,638, filed on Nov. 3, 2010, the content of which is incorporated herein by reference.

BACKGROUND OF THE RELATED ART

High efficiency operation is an important requirement in many switched reluctance machine (SRM) applications. Efficiency is increased by enhancing torque generation for an excitation. Related-art SRMs have reached an upper limit in the efficiency achievable through their shapes and configurations, but have not achieved the high power-densities provided by synchronous machines with high-energy-density permanent magnets.

FIG. 1 illustrates an SRM having common poles that have no excitation windings. SRM 100 includes a stator 102, a rotor 104, and a rotor shaft 106 that rotates rotor 104 within stator 102. Stator 102 has back iron 108 and salient excitation poles 110, 112 that each have a winding 114 through which an excitation current flows during an excitation phase associated with the excitation pole; excitation poles 110 are associated with phase A excitation, and excitation poles 112 are associated with phase B excitation. Stator 102 also has common poles 120 that have no excitation windings. Rotor 104 has back iron 116 and salient poles 118; rotor poles 118 may each be shaped (i.e., contoured) to provide a varying air gap as the rotor pole rotates past a stator pole or may be unshaped so as to provide a constant air gap with the stator pole as the rotor pole rotates past the stator pole. SRM 100 provides high power-density compared to an SRM having the same number of rotor poles and excitation poles, but no common poles.

Common poles 120 are disposed between excitation poles 110, 112 of different phases so as to prevent flux reversal within stator 102. The pole arc of each common pole 120 equals one rotor pole pitch, which is the angular distance between two adjacent rotor poles; this common-pole arc enables the equivalent of one rotor pole to be fully under the common pole at all times. Although each of two rotor poles may be partially under a common pole at a particular moment, the combined area of the rotor pole faces under the common pole remains constant throughout the rotation of rotor 104 and this combined area is equal to the area of a single rotor pole face.

The variation of reluctance between a rotor pole and an excitation pole increases as the rotor pole moves toward the excitation pole. But the reluctance variation between a common pole and a rotor pole is small and almost insignificant compared to the reluctance variation experienced by an excitation pole as the rotor rotates. Thus, near-constant reluctance is presented to a common pole and negligible reluctance variation is contributed by common poles 120 to SRM 100's overall reluctance variation. And because common poles 120 provide negligible reluctance variation, they do not appreciably contribute to torque generation; the machine torque comes almost entirely from the reluctance variation between the excited stator poles and their corresponding rotor poles.

Common poles 120: (1) provide a path for the flow of return flux, (2) always carry unidirectional flux, and (3) cause a unidirectional flow of flux in stator back iron 108, making the entire stator structure free of flux reversals. The absence of flux reversal minimizes core losses in SRM 100, thus boosting the efficiency and, indirectly, the power density of SRM 100.

SUMMARY OF THE INVENTION

The invention disclosed herein overcomes the negligible variation of reluctance within common poles of related-art switched reluctance machines (SRMs) and produces greater torque generation. These benefits are achieved without increasing the machine dimensions or winding turns. Thus, without increasing the weight and volume of steel laminations and winding copper within an SRM, the torque and output power may be increased.

The key to increasing torque generation and output power is to ensure that reluctance variation exists at all times for all overlapping surfaces of stator and rotor poles. This may be achieved by splitting, or creating air slots within, common poles of an SRM such that reluctance variation between the rotor poles and common poles is created as a rotor pole traverses under the common pole.

These and other objects of the invention may be achieved, in whole or in part, by an electromagnetic machine stator having a common pole and a plurality of excitation poles. Each of the excitation poles has a coil wound around it for inducing a magnetic flux through the excitation pole. The common pole does not have a coil wound around it for inducing a magnetic flux. A flux barrier, disposed within the common pole, inhibits the flow of flux from one part of the common pole across the flux barrier to another part of the common pole. The flux barrier is less conducive to the flow of flux than is the common pole. More simply, the flux barrier has greater reluctance than does the common pole.

Additionally, the objects of the invention may be achieved, in whole or in part, by an electromagnetic machine having a rotor and a stator. The rotor has a rotor pole, and the stator has: (1) an excitation pole with a coil wound around it for inducing a magnetic flux through the excitation pole and (2) a common pole without a coil wound around it for inducing a magnetic flux. A flux barrier, disposed within the common pole, inhibits the flow of flux from one part of the common pole across the flux barrier to another part of the common pole. The flux barrier is less conducive to the flow of flux than is the common pole.

Still further, the objects of the invention may be achieved, in whole or in part, by a segment of an electromagnetic machine stator. The stator segment has: (1) an excitation pole for conveying a magnetic flux when a coil wound around the excitation pole is excited by the flow of a current; (2) a leftmost portion of a first common pole; and (3) a rightmost portion of a second common pole. A back material interconnects the excitation pole with the leftmost portion of the first common pole and the rightmost portion of the second common pole, such that the leftmost portion of the first common pole is interconnected on one side of the excitation pole and the rightmost portion of the second common pole is interconnected on the other side of the excitation pole.

BRIEF DESCRIPTION OF THE DRAWINGS

Preferred embodiments of the invention are described in the following paragraphs of the specification and may be better understood when read in conjunction with the attached drawings, in which.

DETAILED DESCRIPTION OF THE INVENTION

Figure 1:
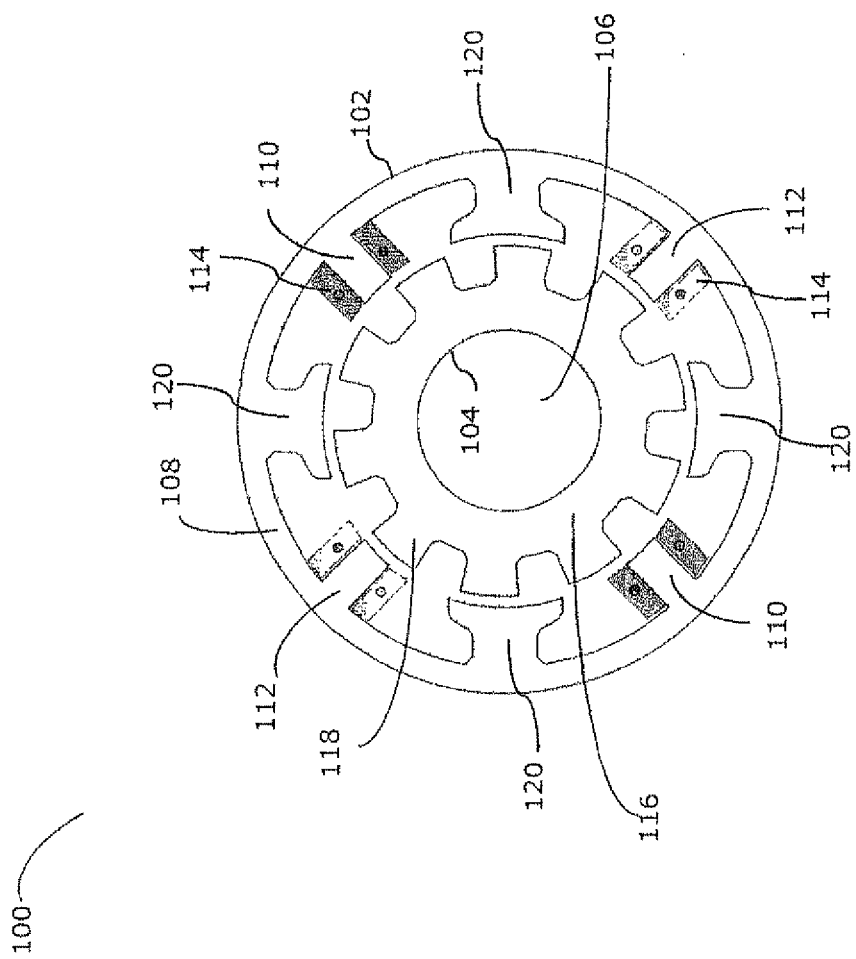
FIG. 1 illustrates a switched reluctance machine (SRM) having common poles that have no excitation windings.
Figure 2:
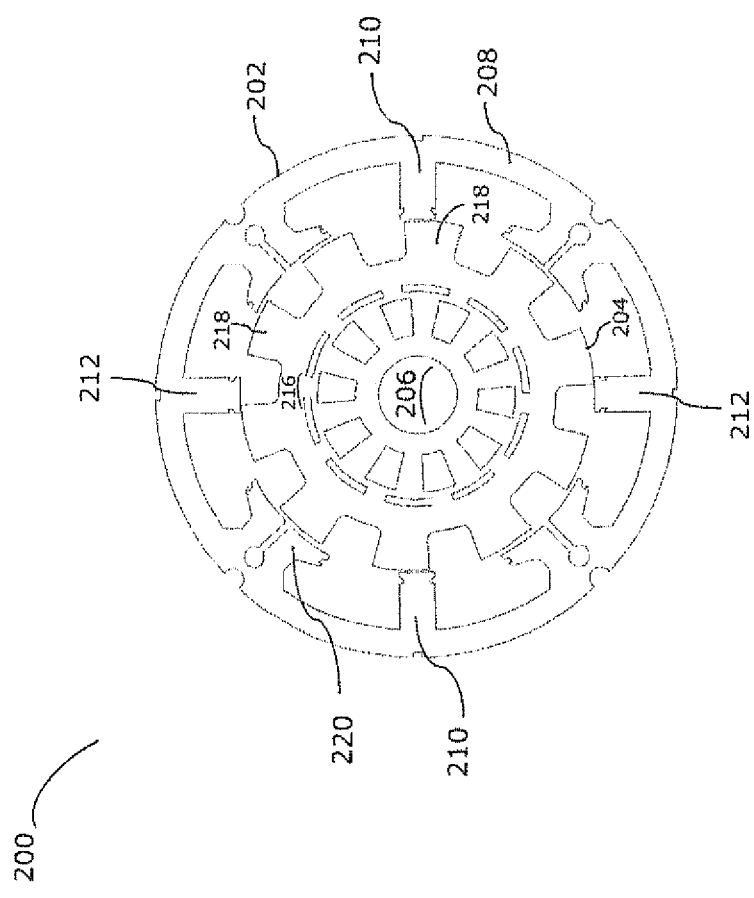
FIG. 2 illustrates an SRM embodiment of the invention in which a single air slot exists within each common pole of the SRM.

FIG. 2 illustrates a switched reluctance machine (SRM) embodiment of the invention in which a single air slot exists within each common pole of the SRM. SRM 200 includes a stator 202, a rotor 204, and a rotor shaft 206 that rotates rotor 204 within stator 202. Stator 202 has back iron 208 and salient excitation poles 210, 212 that each have a winding (not shown) through which an excitation current flows during an excitation phase associated with the excitation pole. Excitation poles 210 are associated with phase A excitation, and excitation poles 212 are associated with phase B excitation. Stator 202 also has common poles 220 that have no excitation windings. Rotor 204 has back iron 216 and salient poles 218.

Figure 3:
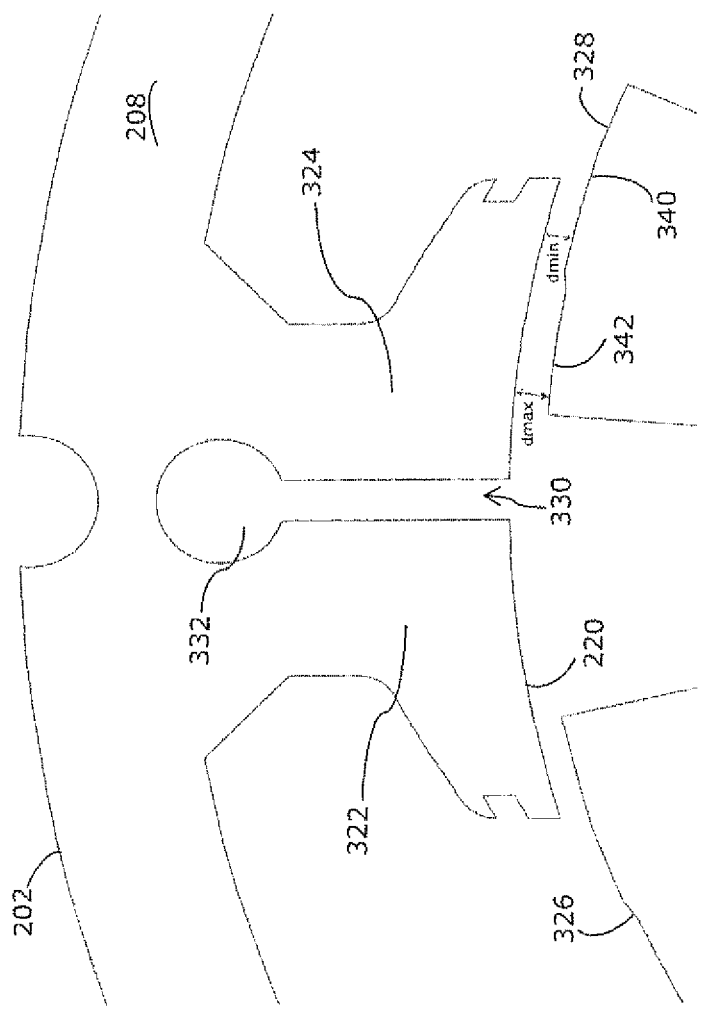
FIG. 3 illustrates a common pole of the SRM illustrated in FIG. 2 in greater detail.

FIG. 3 illustrates a common pole of the SRM illustrated by FIG. 2 in greater detail. Common pole 220 has an air slot 330 along a radial segment of the salient pole that bisects common pole 220 into mirror-image side parts 322, 324. Air slot 330 has greater reluctance than the material of the common pole and, thus, inhibits the flow of flux between side parts 322, 324. For example, as flux flows from a rotor pole 326 into side part 322 and subsequently into back iron 208, air slot 330 inhibits this flux from passing into side part 324, though this inhibition is not absolute. Similarly, flux flowing into side part 324 from a rotor pole 328 mostly flows through side part 324 and into back iron 208, with little of the flux crossing air slot 330 so as to enter back iron 208 through side part 322. Cylindrical hole 332 within air slot 330 serves as a bolt or rivet hole to secure together the laminations of stator 202. Cylindrical hole 332 is disposed within back iron 208 and, thus, SRM 200 does not require space outside the stator laminations to mount the securing bolts or rivets.

As may be determined by inspection of FIG. 3, rotor pole 328 is nearly aligned with common pole 220 and has a maximum air gap, 342, $d_{max}$, with common pole 220 on the leftmost side of rotor pole 328 and a minimum air gap, 340, $d_{min}$, with common pole 220 on the rightmost side of rotor pole 328. As explained below, the varying air gap between the rotor and stator poles improves the torque and power generation of SRM 200.

Figure 4:
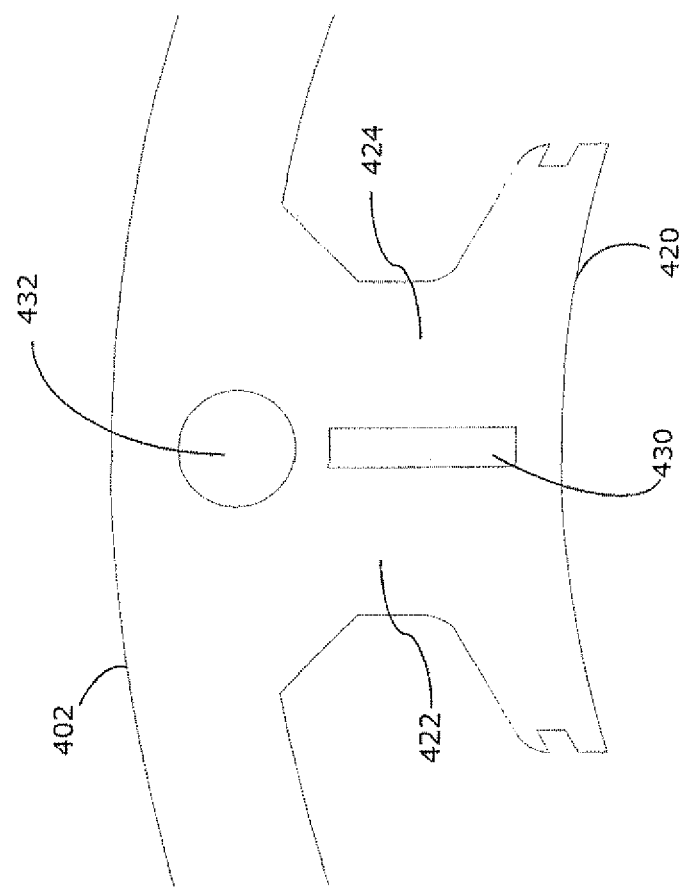
FIG. 4 illustrates a second embodiment of the invention in which two air slots exist within each common pole of the SRM.

FIG. 4 illustrates a second embodiment of the invention in which two air slots exist within each common pole of the SRM. Stator 402 has a common pole 420 with a longitudinal air slot 430, along a radial segment of the pole, that inhibits the flow of flux between side parts 422, 424 in a manner similar to that provided by air slot 330 with respect to side parts 322, 324. Cylindrical hole 432 serves both as an air slot to inhibit the flow of flux and as a bolt or rivet hole to secure together laminations of stator 402. Because air slot 430 and cylindrical hole 432 do not form a continuous air slot that entirely bisects common pole 420 into two mirror image side parts, as do air slot 330 and cylindrical hole 332, air slot 430 and cylindrical hole 432 do not provide as great an inhibition to the flow of flux between side parts 422, 424 as do air slot 330 and cylindrical hole 332 with respect to side parts 322, 324.

Figure 5:
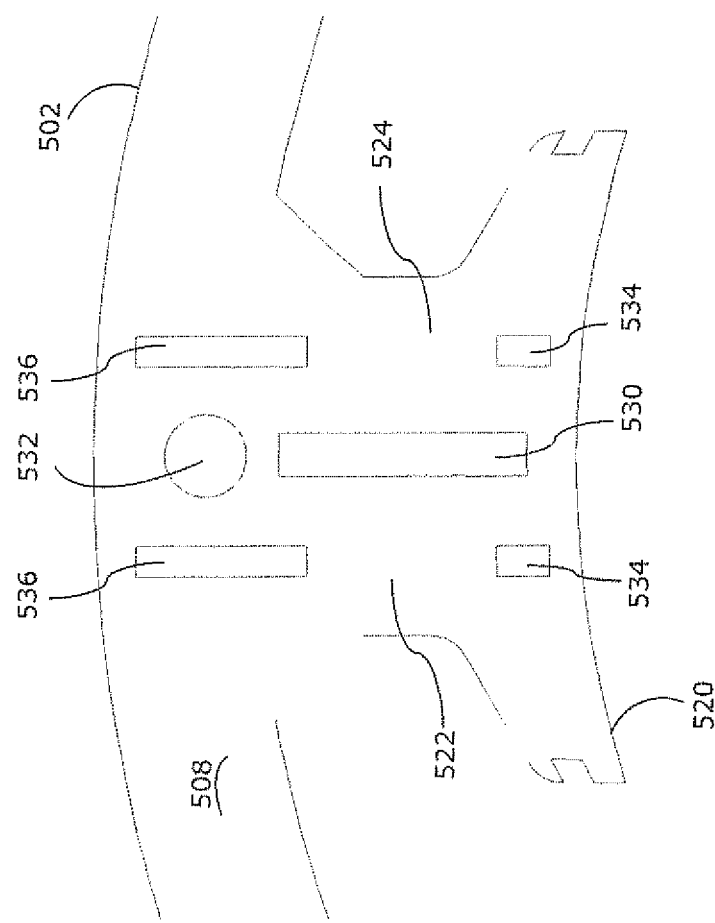
FIG. 5 illustrates a third embodiment of the invention in which multiple air slots exist within each common pole of the SRM.

FIG. 5 illustrates a third embodiment of the invention in which multiple air slots exist within each common pole of the SRM. Stator 502 has a common pole 520 with a longitudinal air slot 530 along a radial segment of the pole that inhibits the flow of flux between side parts 522, 524 in a manner similar to that provided by air slot 430 with respect to side parts 422, 424. Two additional air slots 534 are disposed on opposite sides of air slot 530, near the face of common pole 520, such that one of air slots 534 is within side part 522 and the other is within side part 524. Similarly, two additional air slots 536 are disposed on opposite sides of a cylindrical hole 532, extending from back iron 508 into common pole 520, such that one of air slots 536 extends into side part 522 and the other extends into side part 524. Air slot 530 is a primary flux barrier due to its large size, and air slots 534, 536 are auxiliary flux barriers due to their smaller sizes. Multiple flux barriers are more effective than a single barrier, but are more expensive to manufacture. Cylindrical hole 532 serves both as an air slot and as a bolt or rivet hole to secure together laminations of stator 502.

Figure 6:
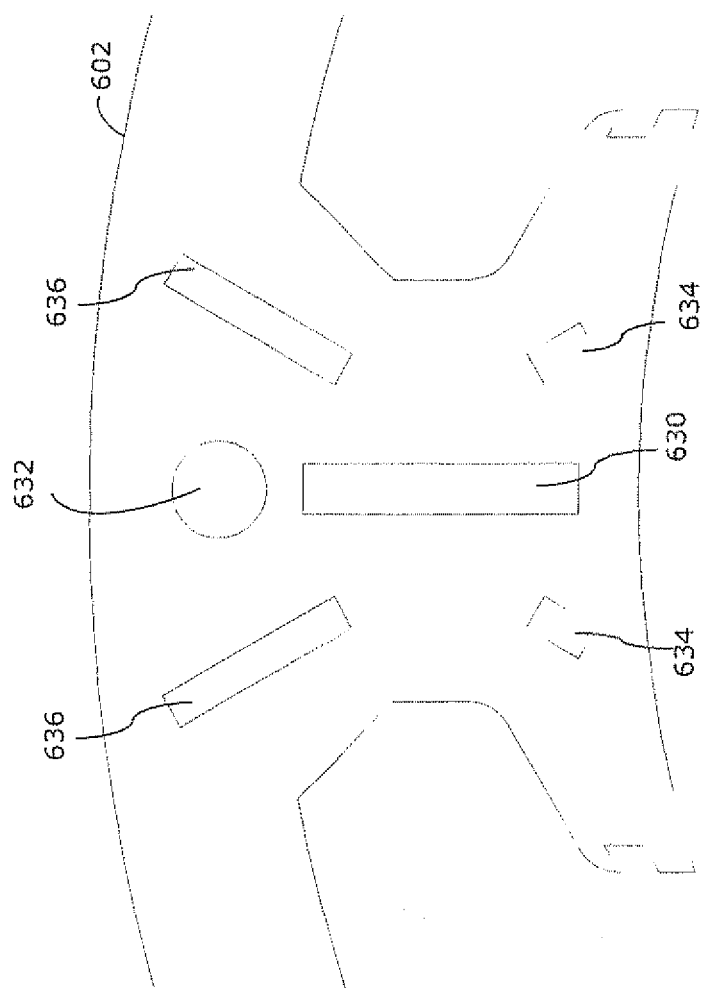
FIG. 6 illustrates a fourth embodiment of the invention in which multiple air slots exist within each common pole of the SRM.

FIG. 6 illustrates a fourth embodiment of the invention in which multiple air slots exist within each common pole of the SRM. Just as with stator 502 of FIG. 5, stator 602 has a primary barrier composed of an air slot 630, a cylindrical hole 632, and multiple auxiliary air slots 634, 636. The larger, primary barrier more effectively bars the flow of flux than do the smaller, auxiliary barriers. Stator 602 differs from stator 502 in that longitudinal axes of auxiliary air slot barriers 634, 636 are disposed at a non-zero angle with respect to the longitudinal axis of primary air slot barrier 630; whereas the longitudinal axes of primary air slot barrier 530 and auxiliary air slot barriers 534, 536 are parallel. The inclined axes of auxiliary air slot barriers 634, 636, with respect to the axis of primary air slot barrier 630 increases the effectiveness of the barriers to flux flow.

Figure 7:
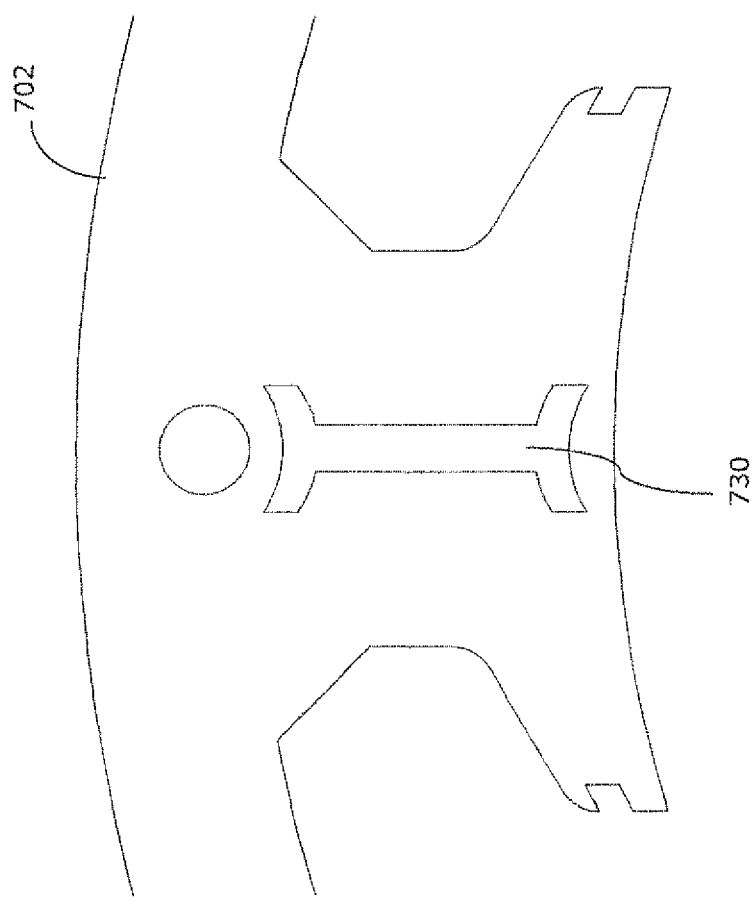
FIG. 7 illustrates a fifth embodiment of the invention in which two air slots exist within each common pole of the SRM.

FIG. 7 illustrates a fifth embodiment of the invention in which two air slots exist within each common pole of the SRM. Stator 702 has a similar configuration to that of stator 402 illustrated by FIG. 4; however, primary air slot 430 within stator 402 has a rectangular shape, whereas primary air slot 730 within stator 702 does not. Instead, air slot 730 has the shape of a column with a wider base at the foot of the column and a wider crown at the head of the column.

Figure 8:
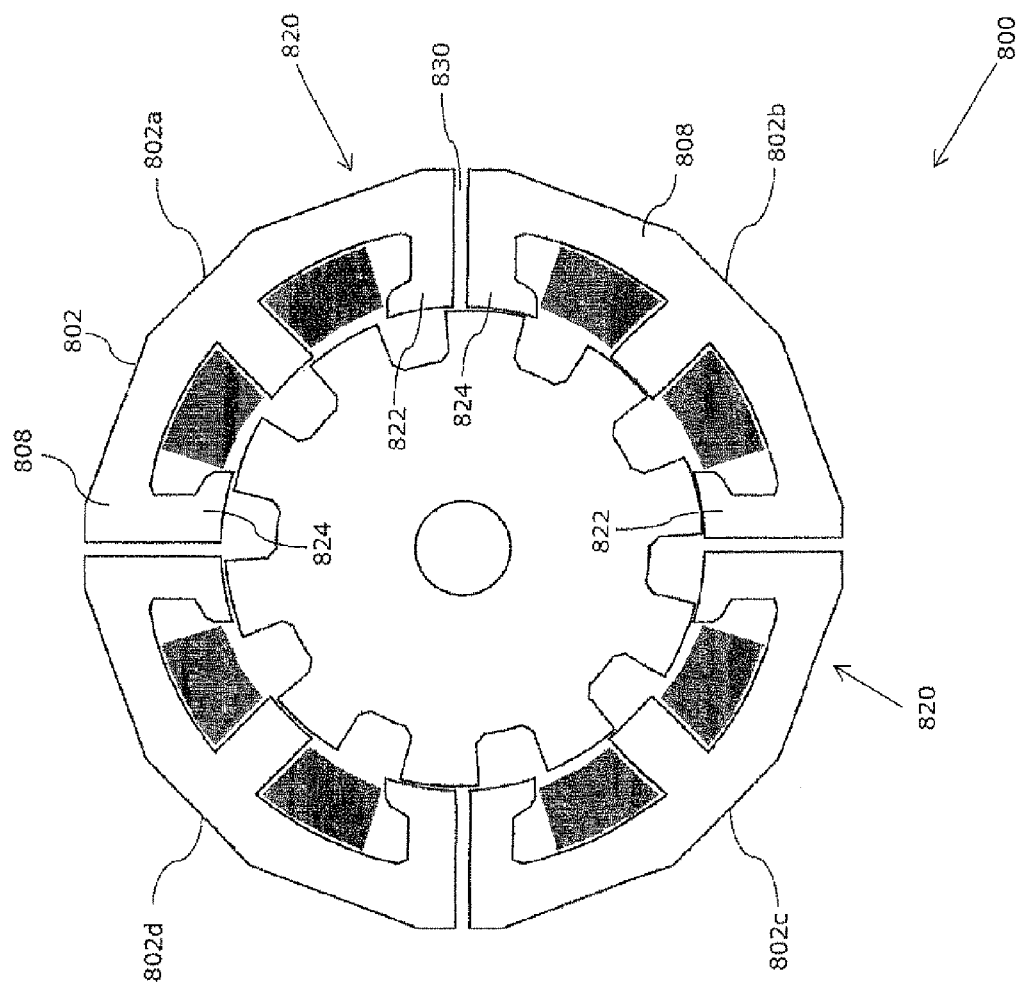
FIG. 8 illustrates a sixth embodiment of the invention in which an SRM stator is composed of multiple isolated sections.

FIG. 8 illustrates a sixth embodiment of the invention in which an SRM stator is composed of multiple isolated sections. SRM 800 has a stator 802 composed of four isolated stator sections 802a, 802b, 802c, 802d that have no physical connection to one another through their respective back irons 808. Each stator section 802a, 802b, 802c, 802d has an arcuate shape with a first side part 822 of a common pole 820 at one end of the arc and a second side part 824 of another common pole at the other end of the arc. For each stator section 802a, 802b, 802c, 802d, an air slot 830 completely separates the first side part from the second side part of an adjacent stator section. Air slots 830 also completely separate back iron 808 of each stator section 802a, 802b, 802c, 802d from back iron 808 of an adjacent stator section. The adjoining first and second side parts of adjacent stator sections constitute a common pole 820; SRM has four such common poles 820. Air slot 830 serves to inhibit the flow of flux between first side part 822 and second side part 824 by providing magnetic isolation between the two side parts.

The difference in performance, particularly in the torque, between an SRM having each of its common poles partially or fully separated into two parts and an SRM having no such separation can be derived based on a few assumptions. These assumptions are:

1. the magnetic equivalent circuit of the SRM is linear, though the magnetic equivalent circuit for the SRM can be modified to account for saturation;
2. the air gaps between the stator and rotor poles vary linearly up to an angle θrv;
3. θ is the overlap angle between the rotor pole and stator pole (excitation pole, common pole, or split part of the common pole);
4. m is the ratio of the maximum to minimum air gaps between the stator and rotor poles, when they are near alignment;
5. θrv is the rotor pole arc angle;
6. the air gap decreases from one end of the rotor (e.g., the leading edge of the rotor that comes first in close proximity to the stator pole as the rotor moves) to the other end of the rotor (e.g., the trailing edge of the rotor).

Based on the six assumptions identified above, the torque of the machines with split common poles and without split common poles can be derived from the equivalent magnetic circuit described in R. Krishnan, "Switched reluctance motor drives", CRC Press, 2001, the content of which is incorporated herein by reference. From this derivation, the ratio of the torque (Tev) provided by a split common-pole SRM with 8 stator poles and 10 rotor poles and the torque (Te) provided by an SRM without split common poles may be determined and plotted against the ratio of the overlapping angle of the stator and rotor poles with respect to the rotor pole arc, θrv.

Figure 9:
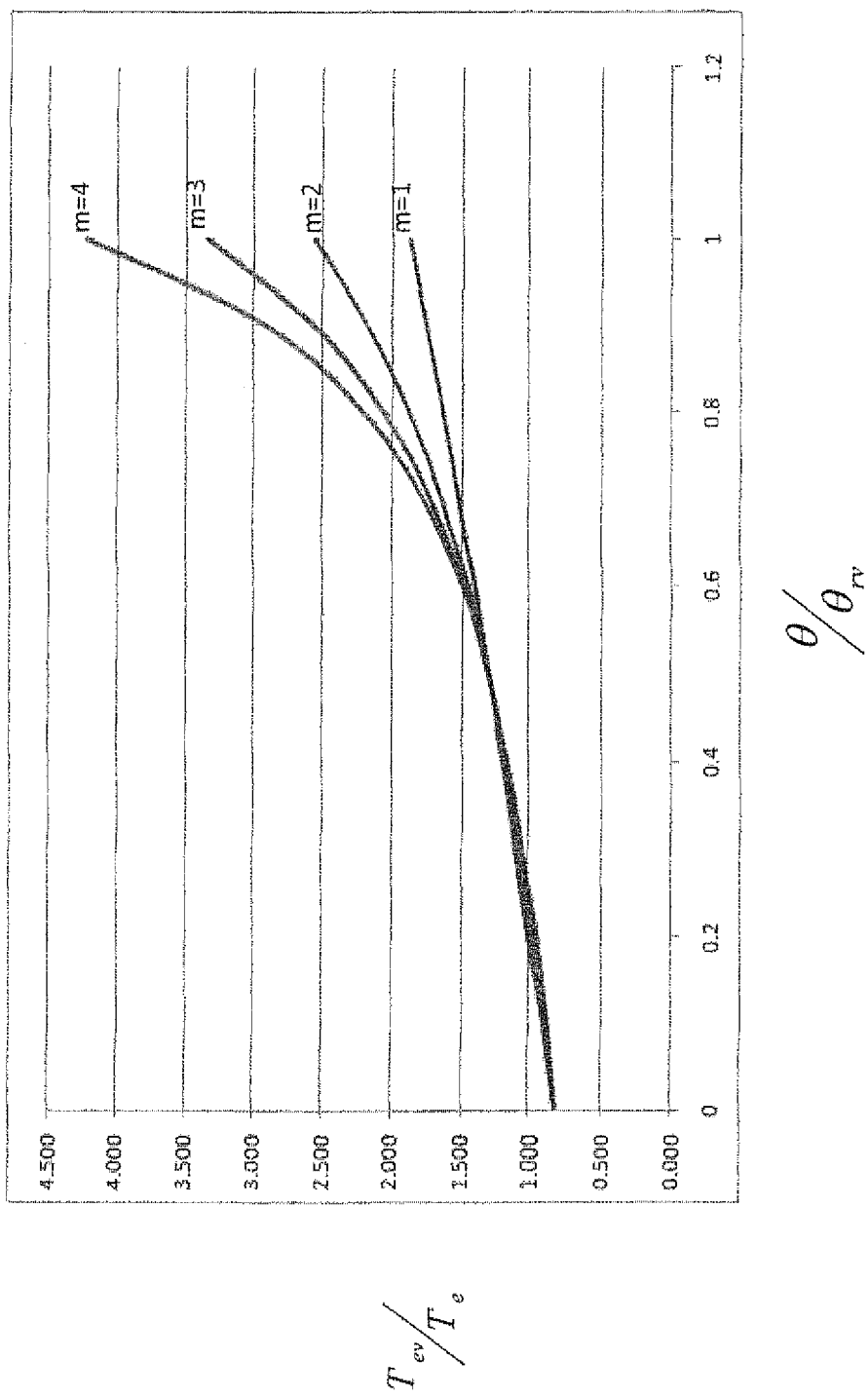
FIG. 9 illustrates the torque ratio for an SRM with split common poles to one without split common poles as a factor of the ratio of the overlapping stator-to-rotor pole angle with respect to the rotor pole arc, for various values of the ratio between maximum and minimum air gaps, m.

FIG. 9 illustrates the torque ratio for an SRM with split common poles to one without split common poles as a factor of the ratio of the overlapping stator-to-rotor pole angle with respect to the rotor pole arc, for various values of the ratio between maximum and minimum air gaps, m. The following inferences can be drawn from the plots of FIG. 9:

1. Up to a value of 0.2 p.u. (per unit, i.e., the normalized value) of normalized overlap angle between the stator and rotor poles, the torque of an SRM having split common poles is lower than that of an SRM not having split common poles, by as much as 17%. The difference is reduced to zero as the normalized overlap angle approaches 0.2 p.u.
2. For normalized overlap angles greater than 0.2 p.u., the ratios of torque for an SRM with split common poles to that for an SRM without split common poles increase to peak values of 1.8 to 4.4 p.u. for values of ranging from 1 to 4. For normalized overlap angles greater than 0.2 p.u., phase current can be maintained throughout the phase, except at the tail end of the overlap where the phase current has to be turned off to prevent the machine from entering a negative-torque generating region. Preventing the machine from entering the negative-torque region prevents the highest torque from being harvested. The safest level up to which the phase current and, hence, torque production can be maintained is about 0.8 p.u. of overlap angle, in practice. But even for a lower overlap-angle-restricted operating point, the torque produced by a split common-pole SRM is about 1.6 to 2.4 times that of a machine without split common poles.
3. A unity 'm' value indicates that the air gap remains constant from the leading edge of the rotor pole face to the trailing edge. And even for a unity value of 'm,' an SRM having split common poles provides substantially greater torque, over a large range of normalized overlap angles of the stator and rotor poles, than does an SRM without split common poles. Thus, the use of split common poles is beneficial for increasing the torque produced by an SRM and increasing the power and power density of an SRM.

The best flux blocking capability, from one side or half of the common pole to the other side or half of the common pole, is achieved by entirely separating the sides/halves of the common poles, as illustrated in FIG. 8. But splitting the common poles entirety poses a problem in assembly. The use of air slots within the common poles provides substantial flux isolation across the common pole halves or sides, without having to assemble multiple separate parts. The above-described embodiments that do not have fully split or cut common poles do not provide perfect magnetic isolation of one side from the other side in the common pole, but do isolate them extremely well without destroying the integrity of a one-piece lamination having all the common and excitation poles. Perfect magnetic isolation, which is desirable for an SRM, is possible with completely cut common poles, but entails an expensive assembly process.

The above-described invention may be applied to an SRM having stator poles with excitation windings and common poles without excitation windings. Any number of stator and rotor poles may be used, and all forms of SRMs, including linear SRMs and transverse or axial flux-type SRMs, may be used. The common poles are split, such as with air gaps or air slots, into two parts so that flux sharing by the two halves of the common poles, split by the air gaps or air slots, is minimized. Other flux barriers within the common poles may also be used to inhibit the flow of flux between halves or separated parts of each common pole.

The common poles may be physically split all the way through with no connection between halves (i.e. the right and left parts of the common poles) of the common poles. In this instance, an integral stator segment may be created having an excitation pole, with its winding, flanked by right and left halves of two distinct common poles. Four such integral stator segments may be assembled to constitute a complete stator for an SRM.

The foregoing has been a detailed description of possible embodiments of the invention. Other embodiments of the invention will be apparent to those skilled in the art from consideration of the specification, drawings, and practice of the invention. Accordingly, it is intended that this specification and its disclosed embodiments be considered as exemplary only, with a true scope and spirit of the invention being indicated by the following claims.

What is claimed is:
1. An electromagnetic machine stator comprising:
a plurality of excitation poles, each of which has a coil wound around it for inducing a magnetic flux through the excitation pole;
a common pole that does not have a coil wound around it for inducing a magnetic flux through the common pole, the common pole defining a substantially continuous arcuate face;
a back material defining an outer perimeter of the electromagnetic machine stator, wherein the plurality of excitation poles and the common pole extend from the back material;
an elongated flux barrier disposed within the common pole and spaced apart from the substantially continuous arcuate face and the outer perimeter of the electromagnetic machine stator along a radial axis of the common pole, wherein the elongated flux barrier inhibits the flow of flux from one part of the common pole across the elongated flux barrier to another part of the common pole to increase torque of an electromagnetic machine including said electromagnetic machine stator, wherein the flux barrier is less conducive to the flow of flux than is the common pole; and a plurality of auxiliary flux barriers disposed within the common pole, each auxiliary flux barrier inhibiting the flow of flux from one part of the common pole to another part of the common pole, wherein each auxiliary flux barrier is less conducive to the flow of flux than is the common pole, and wherein one auxiliary flux barrier of the plurality of flux barriers extends from the common pole into the back material.

2. The electromagnetic machine stator of claim 1, wherein the elongated flux barrier extends into the back material.

3. The electromagnetic machine stator of claim 1, wherein: the common pole comprises two pole sections, and the elongated flux barrier physically separates the two pole sections.

4. The electromagnetic machine stator of claim 1, wherein the elongated flux barrier comprises an air slot.

5. The electromagnetic machine stator of claim 1, wherein a longitudinal axis of one of the auxiliary flux barriers is aligned with a radial axis of the stator.

6. The electromagnetic machine stator of claim 1, wherein longitudinal axes of all of the auxiliary flux barriers are parallel.

7. An electromagnetic machine comprising:

a rotor comprising a rotor pole; and a stator having: (1) an excitation pole that has a coil wound around it for inducing a magnetic flux through the excitation pole, (2) a common pole that does not have a coil wound around it for inducing a magnetic flux through the common pole, the common pole defining a substantially continuous arcuate face, and (3) a back material defining the outer perimeter of the stator, wherein the excitation pole and the common pole extend from the back material, wherein an elongated flux barrier and a plurality of auxiliary flux barriers are disposed within the common pole and spaced apart from the substantially continuous arcuate face and the outer perimeter of the stator along a radial axis of the common pole, wherein the elongated flux barrier and each auxiliary flux barrier inhibit the flow of flux from one part of the common pole to another part of the common pole to increase torque of the electromagnetic machine, wherein the flux barrier has greater reluctance than does the common pole, and wherein one auxiliary flux barrier of the plurality of flux barriers extends from the common pole into the back material.

8. The electromagnetic machine of claim 7, wherein the elongated flux barrier is an air slot, the stator comprises multiple identical laminations, and the air slots of the multiple laminations are configured to receive a securing component.

9. The electromagnetic machine of claim 7, wherein: $\theta$ represents the overlap angle between the rotor pole and common pole, $\theta_{rv}$ represents the rotor pole arc angle, and the ratio of $\theta/\theta_{rv}$ is between 0.4 and 1.

10. The electromagnetic machine of claim 9, wherein an air gap between the rotor pole and the common pole or excitation pole varies along the arc of the rotor pole.

* * * * *